US009662942B2

(12) United States Patent
Bourgeois

(10) Patent No.: US 9,662,942 B2
(45) Date of Patent: May 30, 2017

(54) TIRE WITH IMPROVED BEAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Frederic Bourgeois, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 334 days.

(21) Appl. No.: 14/419,322

(22) PCT Filed: Jul. 25, 2013

(86) PCT No.: PCT/EP2013/065745
§ 371 (c)(1),
(2) Date: Feb. 3, 2015

(87) PCT Pub. No.: WO2014/019939
PCT Pub. Date: Feb. 6, 2014

(65) Prior Publication Data
US 2015/0183277 A1  Jul. 2, 2015

Related U.S. Application Data

(60) Provisional application No. 61/716,931, filed on Oct. 22, 2012.

(30) Foreign Application Priority Data

Aug. 3, 2012  (FR) ...................................... 12 57590

(51) Int. Cl.
B60C 15/00 (2006.01)
B60C 15/06 (2006.01)
B60C 15/024 (2006.01)

(52) U.S. Cl.
CPC ...... B60C 15/0628 (2013.04); B60C 15/0242 (2013.04); B60C 15/06 (2013.01);
(Continued)

(58) Field of Classification Search
CPC ..... B60C 13/00; B60C 15/00; B60C 15/0009; B60C 15/0027; B60C 15/06; B60C 15/0603; B60C 15/0628
See application file for complete search history.

(56) References Cited

U.S. PATENT DOCUMENTS 5,868,190 A  2/1999 Willard, Jr.
5,968,294 A  10/1999 Willard, Jr.
(Continued)

FOREIGN PATENT DOCUMENTS

GB  1485485  9/1977
WO  2010072736  7/2010
WO  2011067211  6/2011

OTHER PUBLICATIONS

International Search Report for PCT/EP2013/065745 dated Oct. 7, 2013.

Primary Examiner — Justin Fischer
(74) Attorney, Agent, or Firm — Dickinson Wright PLLC

(57) ABSTRACT

Tire comprising two beads comprising a bead wire and a carcass anchored around the two bead wires by turning back, a squat filler of small height, a sidewall stiffening reinforcement which is metallic, an outer strip of soft rubber compound, placed axially on the outside of the carcass and of the filler, and a protective layer of rubber compound, wherein the assembly formed by the stiffening reinforcement and the outer strip has a thickness EB(R) and the protective layer has (Continued)

a thickness EE(R), R being the distance with respect to the radially innermost point of the bead wire, and wherein the thicknesses EB(R) and EE(R) satisfy a set of geometric conditions.

13 Claims, 9 Drawing Sheets

(52) U.S. Cl.
CPC ...... *B60C 15/0603* (2013.04); *B60C 15/0653* (2013.04); *B60C 2015/061* (2013.04); *B60C 2015/0621* (2013.04); *B60C 2015/0639* (2013.04); *B60C 2015/0657* (2013.04); *B60C 2015/0678* (2013.04)

(56) References Cited

U.S. PATENT DOCUMENTS

| | | |
|---|---|---|
| 2012/0073724 A1 | 3/2012 | Daval |
| 2012/0325390 A1 | 12/2012 | Bourgeois |

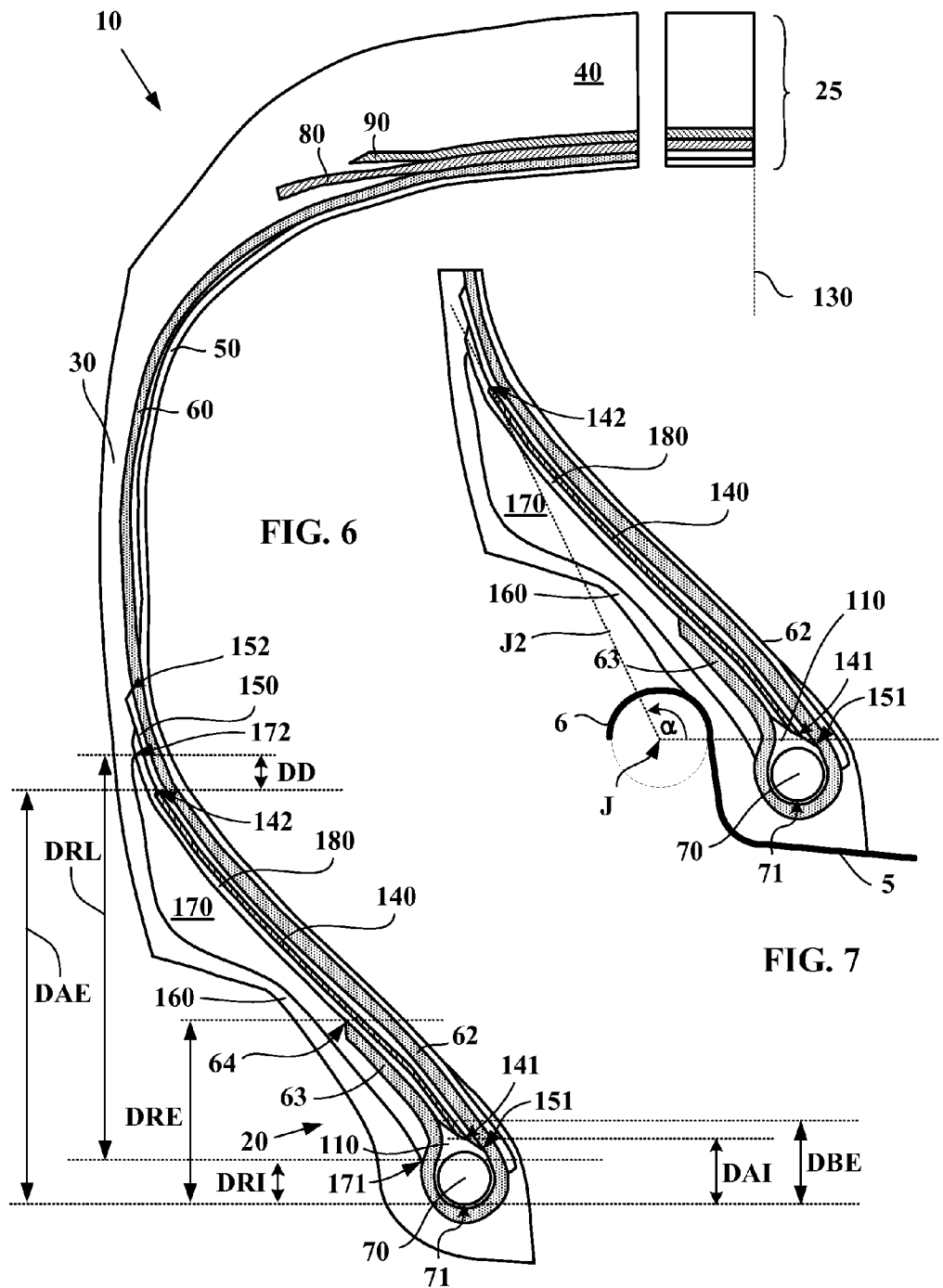

TIRE WITH IMPROVED BEAD

This application is a 371 national phase entry of PCT/EP2013/065745, filed 25 Jul. 2013, which claims benefit of French Patent Application No. 1257590, filed 3 Aug. 2012, and of U.S. Provisional Application No. 61/716,931, filed 22 Oct. 2012, the entire contents of which is incorporated herein by reference for all purposes.

BACKGROUND

1. Field

The present invention relates to tires for passenger vehicles and in particular to the beads of these tires.

2. Description of Related Art

Reducing the greenhouse gases emitted by vehicles is one of the major challenges facing today's vehicle manufacturers. The tire is a significant area in which progress can be made, via a reduction of the rolling resistance, because this has a direct impact on the fuel consumption of the vehicle. Appreciable progress has been made, as demonstrated for example by the great success enjoyed by the Energy® Saver tire recently brought to market by Michelin. The technology employed gives a saving of almost 0.2 l of fuel per 100 km in the mixed cycle, which equates to a reduction of almost 4 g of $CO_2$ per km. This corresponds to approximately one tonne of $CO_2$ that is not discharged into the atmosphere over the life of a vehicle.

Given the predicted increase in the cost of crude oil and the ever-growing consumer awareness of ecological issues, it is nonetheless necessary to continue work aimed at reducing the rolling resistance of tires.

The assembly formed by the bead and the radially inner part of the sidewall of a tire is one of the parts of the tire the structure of which has a very marked impact on the rolling resistance of the tire. It has many roles: it absorbs the tension of the carcass reinforcement and transfers the load to which the tire is subjected from the sidewall to the rim. It therefore guides the crown of the tire from the rim. Its impact on tire handling is considerable, particularly when the tire is heavily loaded. All these functions are usually obtained by combining a reinforcement (comprising the bead wire and the turn-back of the carcass reinforcement about this bead wire) and a "filler" made of rubber compound. The compromise between the stiffness that has to be achieved, particularly for guiding the crown, and the expected endurance generally leads the tire designer to having the carcass reinforcement follow a certain path and to using a filler that is bulky (tall and/or thick) and rigid. The downside of this geometry is significant hysteresis losses, notably in the filler. The stiffening effect of the filler is applied especially in the region remote from the bead and therefore requires a filler that is even bulkier and, therefore, results in ever greater hysteresis losses.

SUMMARY

One of the objectives of the embodiments of the invention is to provide a tire for passenger vehicles that has very low rolling resistance while at the same time having satisfactory cornering stiffness.

This objective is achieved by giving the bead of the tire a special geometry and by a skilful arrangement of the metal reinforcing elements.

More specifically, this objective is achieved by a tire comprising:

two beads designed to come into contact with a mounting rim, each bead comprising at least one annular reinforcing structure having a radially innermost point;

two sidewalls extended the beads radially outwards, the two sidewalls meeting in a crown comprising a crown reinforcement, surmounted by a tread;

at least one radial carcass reinforcement extending from the beads through the sidewalls as far as the crown, the carcass reinforcement comprising a plurality of carcass reinforcing elements embedded in at least one first rubber compound, the carcass reinforcement being anchored in the two beads by being wrapped around the annular reinforcing structure so as to form, within each bead, a main portion and a wrapped-around portion, each wrapped-around portion extending radially outwards as far as an end situated a radial distance DRE from the radially innermost point of the bead annular reinforcing structure, the radial distance DRE being greater than or equal to 5% and less than or equal to 20% (and preferably greater than or equal to 7% and less than or equal to 18%) of the radial height H of the tire;

wherein at least one (and preferably each) bead comprises a filler made of at least one second rubber compound having an elastic modulus greater than or equal to 40 and less than or equal to 60 MPa, the filler being situated, at least partially, radially on the outside of the annular reinforcing structure and at least partially between the main portion and the wrapped-around portion of the carcass reinforcement, the filler extending radially as far as a radial distance DBE from the radially innermost point of the bead annular reinforcing structure, the radial distance DBE being less than or equal to 10% of the radial height H of the tire;

wherein said filler has an axial thickness E(r), this thickness corresponding to the length of the intersection of the filler with a straight line parallel to the axis of rotation of the tire and having an intersection with the filler at a radial distance r from the radially innermost point of the annular reinforcing structure, wherein the thickness E(r) changes such that, in the range of distances r of between 0% and 10% of the radial height H of the tire, the variation in thickness $$\frac{\partial E(r)}{\partial r}$$

is negative and its absolute value is greater than or equal to 0.5 mm/mm, over at least 3% (and preferably greater than or equal to 1 mm/mm, over at least 1.5%) of the radial height H of the tire;

wherein the sidewall extending said at least one bead of the tire further comprises a stiffening reinforcement formed of a plurality of metal reinforcing elements embedded in at least one third rubber compound and oriented at an angle less than or equal to 10 degrees with respect to the circumferential direction, the stiffening reinforcement having, in each radial section, a radially inner end and a radially outer end, such that:

(i) the radial distance DAI between the radially innermost point of the annular reinforcing structure and the radially inner end of the stiffening reinforcement is greater than or equal to 5% and less than or equal to 15% of the radial height H of the tire;

(ii) the radial distance DAE between the radially innermost point of the annular reinforcing structure and the radially outer end of the stiffening reinforcement is greater than or equal to 20% and less than or equal to 40% (and preferably greater than or equal to 25% and less than or equal to 35%) of the radial height H of the tire;
wherein said at least one bead further comprises an outer strip placed axially on the outside of the carcass reinforcement and of the filler, each outer strip extending from a radially inner end of the outer strip, situated a distance DRI from the radially innermost point of the bead annular reinforcing structure, DRI being less than or equal to 20% of the radial height H of the tire, as far as a radially outer end, the radial distance DRL between the radially outer end of the outer strip and the radially inner end of the outer strip being greater than or equal to 25% of the radial height H of the tire, and the outer strip is made from at least one fourth rubber compound having an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C.;
wherein the assembly formed by the stiffening reinforcement and the outer strip has a thickness EB(R), this thickness corresponding to the length of the intersection of the direction perpendicular to the main portion of the carcass reinforcement with said assembly, R denoting the distance separating the intersection of said direction perpendicular to the main portion of the carcass reinforcement with the carcass reinforcement from the radially innermost point of the annular reinforcing structure, wherein the thickness EB(R) changes such that:
(i) in the range of distances r of between 10 and 20% of the height H of the tire, the variation in thickness $$\frac{\partial EB(R)}{\partial R}$$

is negative and its absolute value is greater than or equal to 0.0 mm/mm and less than or equal to 0.1 mm/mm, over at least 5% of the height H of the tire,
(ii) in the range of distances r of between 15 and 25% of the height H of the tire, the variation in thickness $$\frac{\partial EB(R)}{\partial R}$$

is positive and its absolute value is greater than or equal to 0.20 mm/mm, over at least 2% of the height H of the tire,
(iii) in the range of distances r of between 25 and 45% of the height H of the tire, the variation in thickness $$\frac{\partial EB(R)}{\partial R}$$

is negative and its absolute value is greater than or equal to 0.25 mm/mm, (and preferably greater than or equal to 0.30 mm/mm) over at least 4% of the height H of the tire,
and wherein a protective layer formed of at least one fifth rubber compound is arranged axially on the outside of the outer strip, this protective layer having a thickness EE(R), this thickness corresponding to the length of the intersection of the direction perpendicular to the axially outer contour of the outer strip with said protective layer, wherein the thickness EE(R) changes such that the variation in thickness $$\frac{\partial EE(R)}{\partial R}$$

is greater than or equal to −0.20 mm/mm and less than or equal to 0.20 mm/mm for values of R of between R=RI+0.20 (RE−RI) and R=RI+0.885 (RE−RI) where "RI" denotes the value corresponding to the radially inner end of the outer strip and "RE" denotes the value corresponding to the radially outer end of the outer strip.

According to one advantageous embodiment, in any radial section, the radially outer end of the outer strip is situated radially on the outside of the radially outer end of the stiffening reinforcement such that the radial distance DD separating these ends is less than or equal to 8 mm (and preferably less than or equal to 5 mm). A radial distance DD significantly in excess of the value of 8 mm in fact has a negative effect on the rolling resistance.

According to another advantageous embodiment, in any radial section, the thickness of rubber compound separating the carcass reinforcing elements and the metal reinforcing elements of the stiffening reinforcement is at all points greater than or equal to 0.8 mm. Such a thickness guarantees good resistance to the shearing generated by the transmission of tension between the carcass reinforcement and the stiffening reinforcement when the tire is rolling.

According to one particular embodiment, the tire is designed to be mounted on a mounting rim comprising a part forming a rim seat and, radially on the outside of the rim seat, a rim flange of substantially circular profile, and the tire is configured such that, when the tire is mounted on its mounting rim, the radially outer end of the stiffening reinforcement is situated on a straight line passing through the centre of the profile of the rim flange and making with an axial direction an angle α (alpha) open axially towards the inside and radially towards the outside, the angle α (alpha) being greater than or equal to 90° and less than or equal to 120° (and preferably greater than or equal to 100° and less than or equal to 115°). As described in patent application WO 2011/067211, such an angle yields excellent results in terms of rolling resistance.

That same document also discloses other features that may advantageously be combined with a tire according to an embodiment of the invention. Thus it is advantageous to plan for the stiffening reinforcement to be made up of a plurality of discontinuous reinforcing elements, these reinforcing elements being arranged in a plurality of circles (C, C1, C2) concentric with the axis of rotation of the tire.

According to one advantageous embodiment, the stiffening reinforcement is made up of a plurality of discontinuous reinforcing elements of length L0, these reinforcing elements being arranged in a plurality of circles concentric with the axis of rotation of the tire mounted on its rim, each circle being defined by a mean radius measured with respect to said axis of rotation, each discontinuous reinforcing element of length L0 situated on a circle C of radius R being mechanically coupled over coupling lengths L11 and L12 respectively to two discontinuous reinforcing elements situated on a circle C1 of radius R1 less than the radius R, said circle being immediately adjacent to the circle C, wherein the coupling lengths L11 and L12, L11 being considered to be greater than or equal to L12, satisfy the following relationship: 1.5≤K≤4 where K=(1−L12/L0)/(1−L11/L0).

More preferably still, each discontinuous reinforcing element of length L0 situated on a circle C of radius R is mechanically coupled over coupling lengths L11 and L12 to two discontinuous reinforcing elements situated on a circle C1 of radius R1, which circle is immediately adjacent to the circle C, the coupling length L11 being greater than or equal to 55% of L0 and less than or equal to 75% of L0, and the coupling length L12 being greater than or equal to 10% of L0 and less than or equal to 30% of L0; and each discontinuous reinforcing element of length L0 situated on a circle C of radius R is mechanically coupled over coupling lengths L21 and L22 to two discontinuous reinforcing elements situated on a circle C2 of radius R2, which circle is immediately adjacent to the circle C1, the coupling length L21 being greater than or equal to 20% of L0 and less than or equal to 40% of L0, and the coupling length L22 being greater than or equal to 45% of L0 and less than or equal to 65% of L0.

Of course, it is possible and even desirable to combine two or more of the embodiments described.

BRIEF DESCRIPTION OF THE DRAWINGS

FIGS. 6 and 7 depict, in radial section, part of a tire according to an embodiment of the invention.

DETAILED DESCRIPTION OF SPECIFIC EMBODIMENTS

Figure 1:
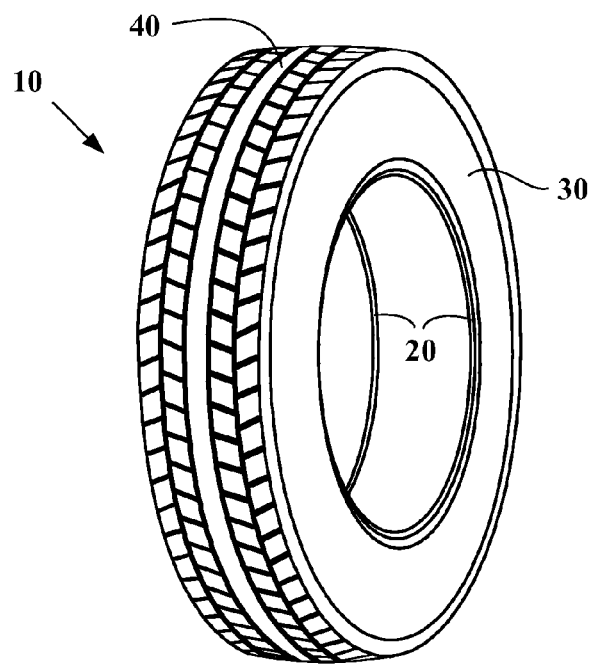
FIG. 1 depicts a conventional tire.

As far as the use of the term "radial" is concerned, it is appropriate to make a distinction between the various ways in which this word is used by the person skilled in the art. Firstly, the expression refers to a radius of the tire. It is with that meaning that a point P1 is said to be "radially inside" a point P2 (or "radially on the inside of" point P2) if it is closer to the axis of rotation of the tire than is point P2. Conversely, a point P3 is said to be "radially outside" a point P4 (or "radially on the outside of" point P4) if it is further from the axis of rotation of the tire than is point P4. Progress will be said to be "radially inwards (or outwards)" when advancing in the direction of smaller (or larger) radii. It is this meaning of the term that applies also to radial distances.

By contrast, a thread or a reinforcement is said to be "radial" when the thread or the reinforcing elements of the reinforcement make with the circumferential direction an angle greater than or equal to 80° and less than or equal to 90°. Let us emphasize that in this document, the term "thread" is to be understood in a very general sense and comprises threads in the form of monofilaments, multifilaments, cords, folded yarns or equivalent assemblies, and irrespective of the material of which the thread is made or the surface treatment it may have to encourage it to bond to the rubber.

Finally, a "radial section" or "radial cross section" here means a section or cross section in a plane containing the axis of rotation of the tire.

An "axial" direction is a direction parallel to the axis of rotation of the tire. A point P5 is said to be "axially inside" a point P6 (or "axially on the inside of" point P6) if it is closer to the median plane of the tire than is point P6. Conversely, a point P7 is said to be "axially outside" a point P8 (or "axially on the outside of" point P8) if it is further from the median plane of the tire than is point P8. The "median plane" of the tire is the plane which is perpendicular to the axis of rotation of the tire and situated equidistant from the annular reinforcing structures of each bead.

A "circumferential" direction is a direction perpendicular both to a radius of the tire and to the axial direction. A "circumferential cross section" is a cross section along a plane perpendicular to the axis of rotation of the tire.

The "tread surface" here means the collection of points on the tread of a tire which will come into contact with the ground when the tire, having been mounted on an appropriate mounting rim and inflated to its service pressure, is rolling on the ground.

The expression "rubber compound" denotes a composition of rubber containing at least one elastomer and a filler.

The "elastic modulus" of a rubber compound means the secant extension modulus obtained under tensile testing in accordance with standard ASTM D 412 of 1998 (test specimen "C"): the apparent secant moduli at 10% elongation, denoted "MA10" and expressed in MPa, are measured under second elongation (i.e. after an accommodation cycle) (standard temperature and relative humidity conditions in accordance with standard ASTM D 1349, 1999).

In this document, the terms "elastic modulus" G' and "viscous modulus" G" denote dynamic properties well known to those skilled in the art. These properties are measured on a Metravib VA4000 type viscoanalyser on test specimens which have been moulded from uncured compositions or on test specimens which have been bonded from cured compositions. Test specimens such as those described in standard ASTM D 5992-96 (the version published in September 2006, initially approved in 1996) in figure X2.1 (circular embodiment) are used. The diameter "d" of the test specimen is 10 mm (it therefore has a circular cross section of 78.5 mm$^2$), the thickness "L" of each of the portions of rubber compound is 2 mm, giving a "d/L" ratio of 5 (in contrast with standard ISO 2856, mentioned in the ASTM standard, paragraph X2.4, which recommends a d/L value of 2).

The response of a test specimen of vulcanised rubber compound subjected to simple alternating sinusoidal shear loading at a frequency of 10 Hz and a stabilised temperature of 23° is recorded. The test specimen is loaded symmetrically about its equilibrium position. The sweep covers amplitudes of deformation from 0.1% to 50% (peak-peak; on the outward cycle; 12 measurement points) then from 50% to 0.1% (peak-peak; on the return cycle; 11 measurement points). The result exploited is the dynamic shear elastic modulus (G') and the viscous shear modulus (G") at 10% deformation on the return cycle.

To assist with the comprehension of the description of the alternative forms depicted with the figures, the same references are used to denote elements that have identical structures.

FIG. 1 schematically depicts a conventional tire 10. The tire 10 comprises a crown comprising a crown reinforcement (not visible in FIG. 1) surmounted by a tread 40, two sidewalls 30 extending the crown radially inwards, and two beads 20 radially on the inside of the sidewalls 30.

Figure 2:
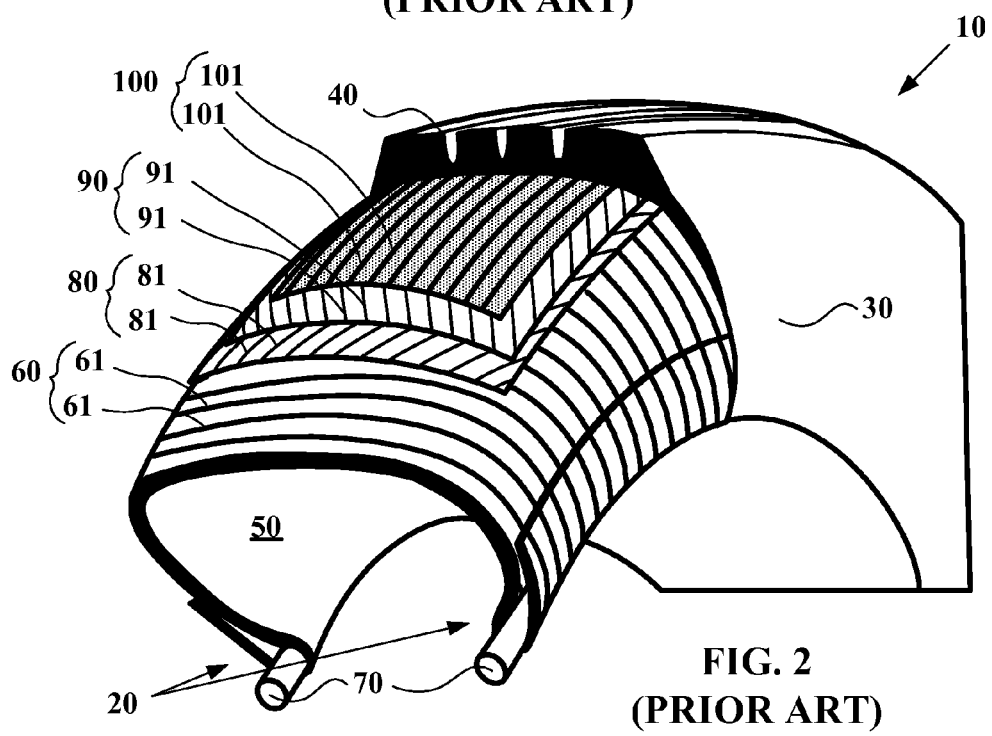
FIG. 2 depicts a partial perspective view of a conventional tire.

FIG. 2 schematically depicts a partial perspective view of a conventional tire 10 and illustrates the various components of the tire. The tire 10 comprises a carcass reinforcement 60 made up of threads 61 coated with rubber compound, and two beads 20 each comprising a bead wire 70 which holds the tire 10 on the rim (not depicted). The carcass reinforcement 60 is anchored in each of the beads 20 by turning back. The tire 10 further comprises a crown reinforcement comprising two plies 80 and 90. Each of the plies 80 and 90 is reinforced by thread-like reinforcing elements 81 and 91 which are parallel within each layer and crossed from one layer to the other, making with the circumferential direction angles of between 10° and 70°. The tire further comprises a hoop reinforcement 100, arranged radially on the outside of the crown reinforcement, this hoop reinforcement being formed of reinforcing elements 101 oriented circumferentially and wound in a spiral. A tread 40 is laid on the hoop reinforcement; it is this tread 40 which provides contact between the tire 10 and the road. The tire 10 depicted is a "tubeless" tire; it comprises an "inner liner" 50 made of a rubber compound that is impervious to the inflating gas, covering the interior surface of the tire.

Figure 3:
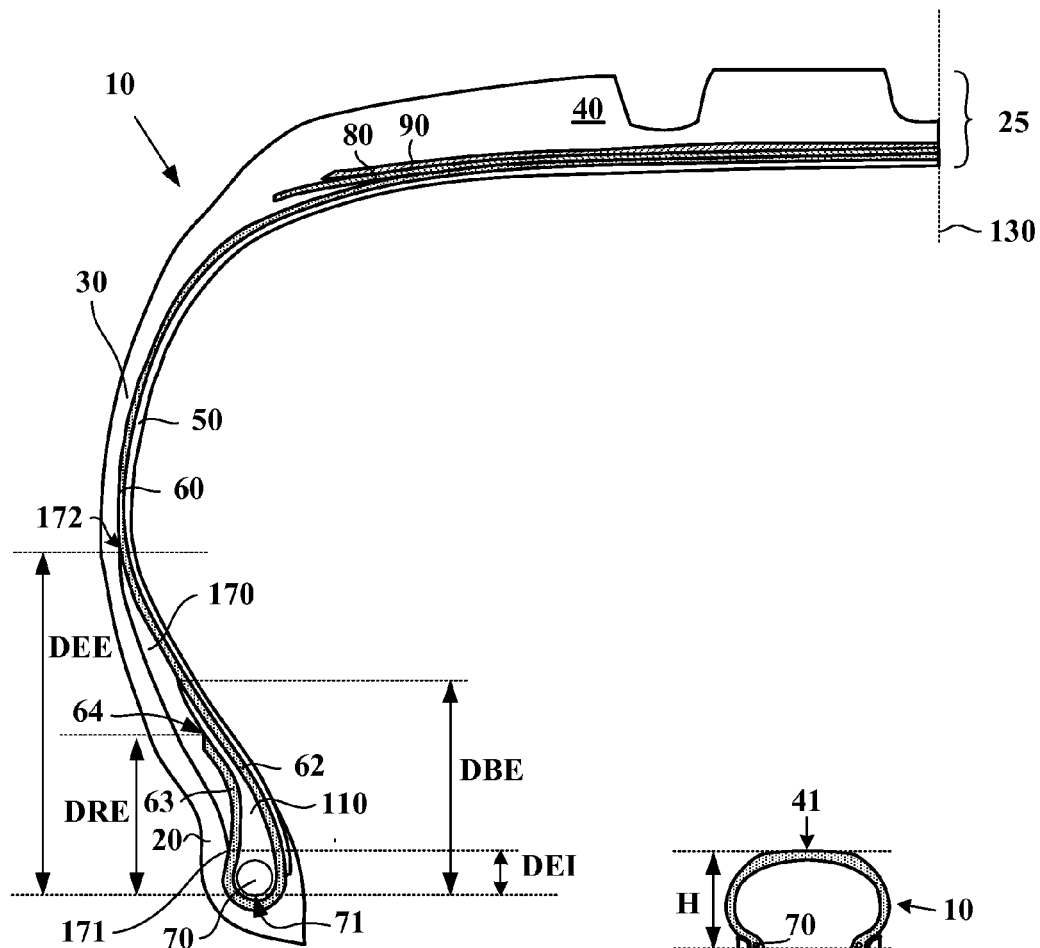
FIG. 3 depicts, in radial section, a portion of a tire according to the prior art.

FIG. 3 schematically depicts, in radial section, a portion of a tire 10 of the prior art, of the Energy™ Saver type marketed by Michelin. The tire 10 comprises two beads 20 designed to come into contact with a mounting rim (not depicted), each bead 20 comprising a bead wire 70. Two sidewalls 30 extend the beads 20 radially outwards and meet in a crown 25 comprising a crown reinforcement formed of a first layer of reinforcing elements 80 and a second layer of reinforcing elements 90 and surmounted radially by a tread 40. Each layer comprises thread-like reinforcing elements, coated in a matrix made of rubber compound. The reinforcing elements of each layer are substantially parallel to one another; the reinforcing elements of the two layers are crossed from one layer to the other at an angle of about 20°, as is well known to those skilled in the art for what is commonly known as "radial tires". The median plane of the tire carries the reference 130.

The tire 10 further comprises a carcass reinforcement 60 which extends from the beads 20 through the sidewalls 30 to the crown 25. This carcass reinforcement 60 here comprises thread-like reinforcing elements oriented substantially radially, i.e. making with the circumferential direction an angle greater than or equal to 80° and less than or equal to 90°.

The carcass reinforcement 60 comprises a plurality of carcass reinforcing elements and is anchored in the two beads 20 by being wrapped around the bead wire 70, so as to form within each bead a main portion 62 and a wrapped-around portion 63. The wrapped-around portion extends radially outwards as far as an end 64 situated a radial distance DRE from the radially innermost point 71 of the bead annular reinforcing structure, the radial distance DRE here being equal to 19% of the radial height H of the tire.

Figure 4:
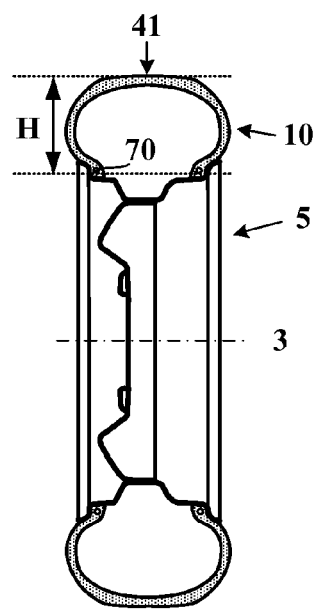
FIG. 4 illustrates how the height H of a tire is determined.

The "radial height" H of a tire is defined as being the radial distance between the radially innermost point 71 of the annular reinforcing structure 70 of the bead 20 and the radially outermost point 41 (FIG. 4) of the tread 40 when the tire 10 is mounted on a mounting rim 5 (as depicted in FIG. 4) and inflated to its service pressure.

Each bead comprises a filler 110, the filler being situated essentially radially on the outside of the bead wire 70 and between the main portion 62 and the wrapped-around portion 63 of the carcass reinforcement 60. Here the rubber compound used has an elastic modulus of 56 MPa.

Each bead further comprises an outer layer or strip 170 placed axially on the outside of the carcass reinforcement and of the filler. The outer strip 170 extends radially on the outside of a radially inner end 171 of the outer strip 170, situated a distance DEI from the radially innermost point 71 of the bead wire 70, as far as a radially outer end 172 situated a distance DEE from the radially innermost point 71 of the bead wire 70. In this instance, the distance DEI is equal to 6.5% and the distance DEE is equal to 41.5% of the radial height H of the tire.

Figure 5:
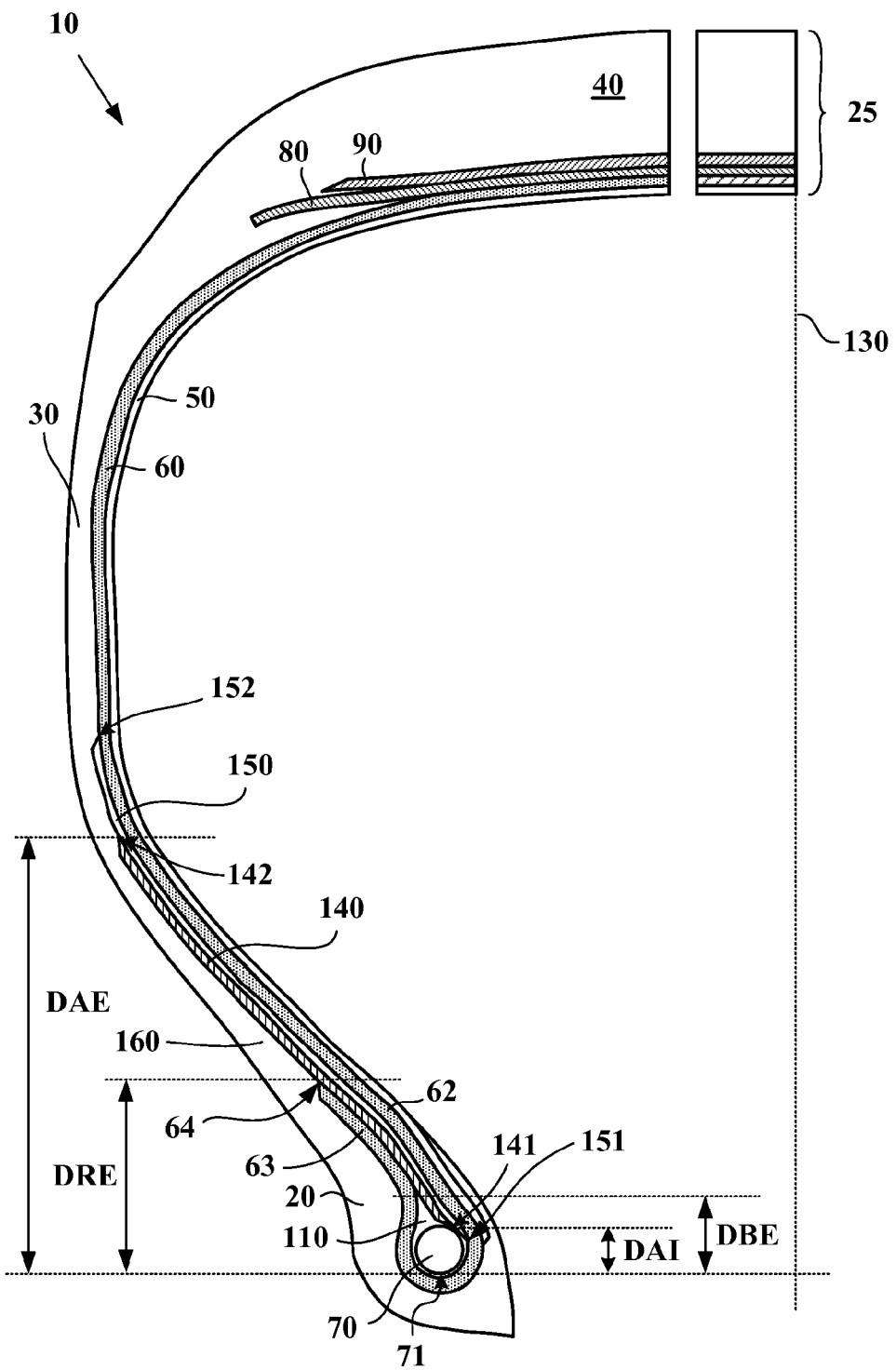
FIG. 5 depicts, in radial section, part of a reference tire.

FIG. 5 depicts, in radial section, a part of a tire 10 disclosed in document WO 2011/067211 and comprising two beads 20 (just one of which has been depicted) designed to come into contact with a mounting rim (not depicted), each bead comprising a bead wire 70. The bead wire 70 has a radially innermost point 71. The two annular reinforcing structures 70 (just one of which has been depicted) define a median plane 130 of the tire, perpendicular to the axis of rotation (not depicted) of the tire and situated equidistant from the annular reinforcing structures 70 of each bead. Two sidewalls 30 (just one of which has been depicted) extend the beads 20 radially outwards. The two sidewalls 30 meet in a crown 25 comprising a crown reinforcement formed by two plies 80 and 90, surmounted by a tread 40.

A radial carcass reinforcement 60 extends from the beads 20 through the sidewalls 30 as far as the crown 25. The carcass reinforcement 60 comprises a plurality of carcass reinforcing elements embedded in at least one first rubber compound known per se to those skilled in the art; it is anchored in the two beads 20 by being wrapped around the bead wire 70 so as to form within each bead a main portion 62 and a wrapped-around portion 63. The wrapped-around portion 63 extends radially outwards as far as an end 64 situated a radial distance DRE from the radially innermost point 71 of the bead wire 70. The radial distance DRE here is equal to 16% of the radial height H of the tire.

The bead 20 comprises a filler 110 formed of a second rubber compound having an elastic modulus greater than or equal to 40 MPa and less than or equal to 60 MPa. Such rubber compounds per se are well known to those skilled in the art. Document WO 2011/067211 gives, by way of example, the composition of a rubber compound that can be used.

The filler 110 is, for the most part, situated radially on the outside of the bead wire 70, between the main portion 62 and the wrapped-around portion 63 of the carcass reinforcement 60. It extends radially out to a radial distance DBE from the radially innermost point 71 of the bead wire 70. The radial distance DBE here is equal to 8% of the radial height H of the tire 10. This short radial height of the filler contributes to the low rolling resistance of the tire. A filler of small volume can be kept, notably to make it easier to manufacture the bead as a whole, because its presence will not lead to significant hysteresis losses. This is because in the immediate vicinity of the bead wire and of the rim seat, both of which are extremely rigid, the deformations experienced when the tire is rolling are very slight. By contrast, in order for the tire to maintain good handling, notably under heavy load, the overall reduction in the filler volume is advantageously compensated for by the presence of an additional stiffening reinforcement 140 which itself leads only to low hysteresis losses.

Figure 8:
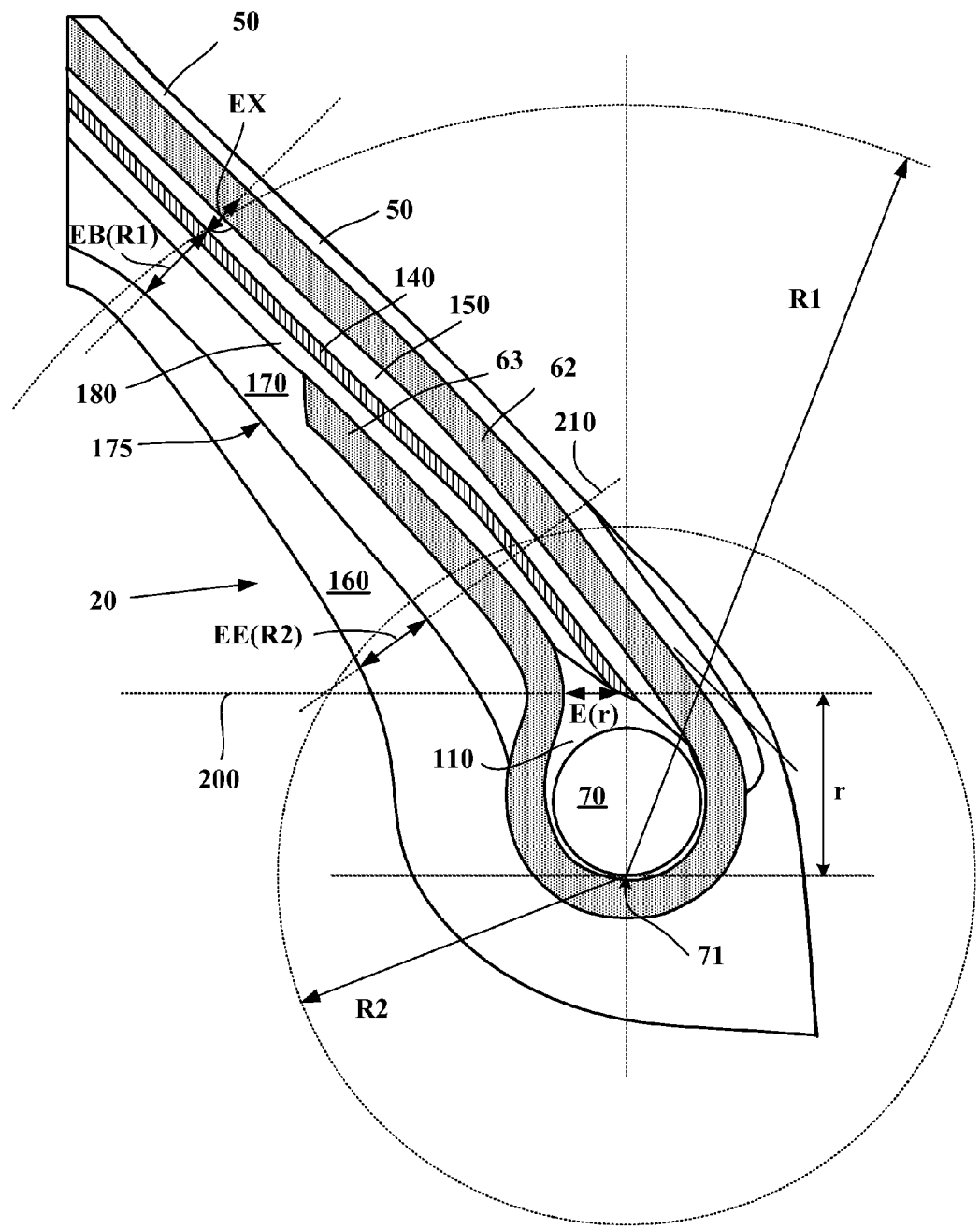
FIG. 8 illustrates how certain thicknesses of a tire according to an embodiment of the invention are determined.

The filler 110 has an axial thickness E(r) which is determined in the way illustrated in FIG. 8. The axial thickness E(r) corresponds to the length of the intersection of the filler with a straight line 200 parallel to the axis of rotation of the tire (indicated using reference 3 in FIG. 4) and having an intersection with the filler 110 at a radial distance r from the radially innermost point 71 of the bead wire 70.

Figure 10:
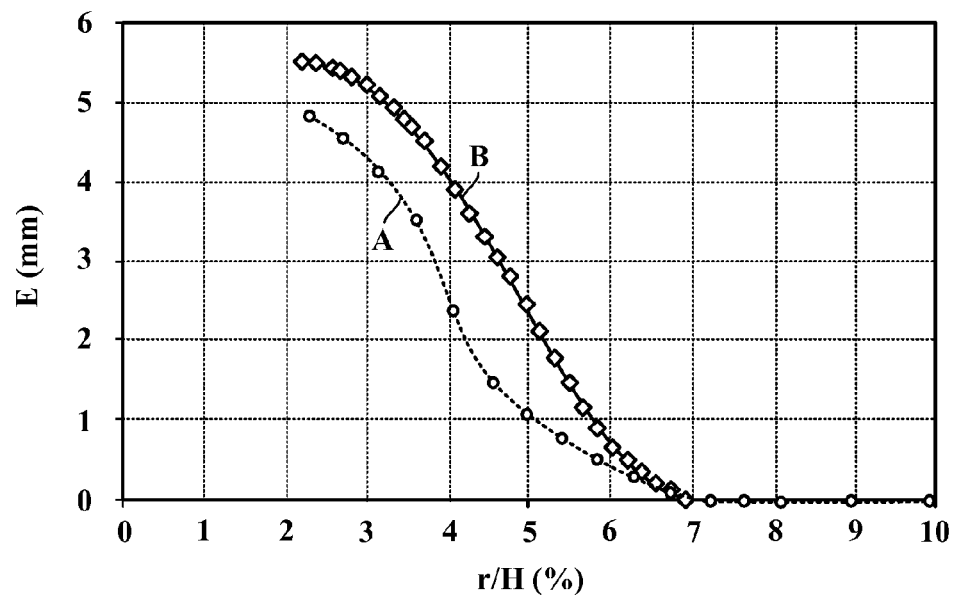
FIGS. 10, 11, 12, 13, 14, and 15 depict certain thicknesses of a tire according to an embodiment of the invention and their variation.
Figure 11:
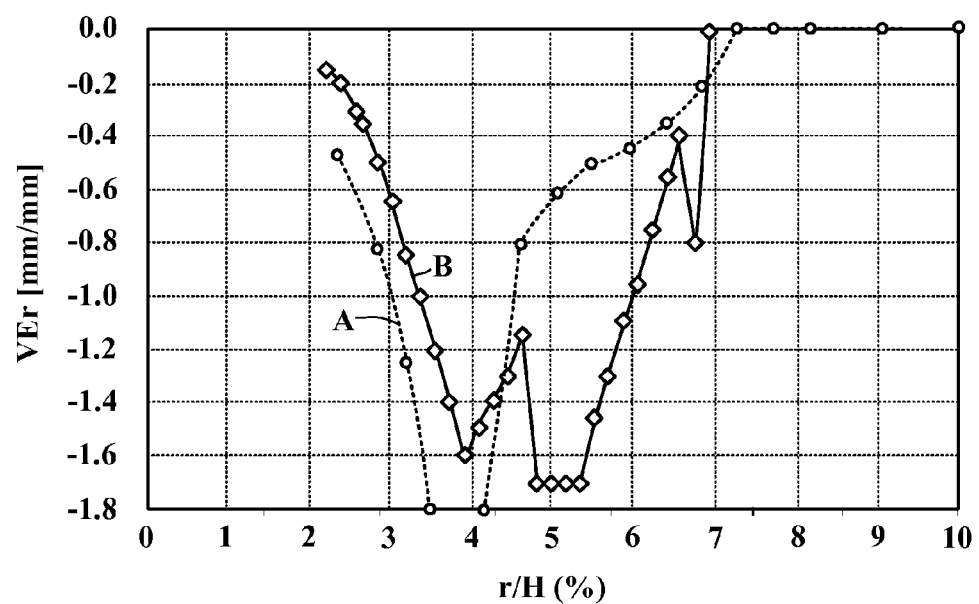

The axial thickness E(r) of the filler 110 of the tire depicted in FIG. 5 is plotted in FIG. 10 (curve A in dotted line; curve B corresponds to the tire according to an embodiment of the invention depicted in FIG. 6). The axial thickness E(r) of the filler 110 of the tire depicted in FIG. 5 changes such that, in the range of distances r of between 0% and 10% of the radial height H of the tire, the variation in thickness $$VEr = \frac{\partial E(r)}{\partial r}$$

is negative and its absolute value is greater than or equal to 0.5 mm/mm, over around 3% of the radial height H of the tire (see FIG. 11, curve A; curve B corresponds to the tire according to an embodiment of the invention depicted in FIG. 6). In this instance, the absolute value of the variation in thickness VEr is even greater than 1 mm/mm over about 1.5% of the radial height H of the tire.

The sidewall 30 comprises a stiffening reinforcement 140 formed of a plurality of metal reinforcing elements embedded in at least one third rubber compound (which could, for example, be identical to one of the rubber compounds used for the carcass reinforcement, which are well known to those skilled in the art) and oriented at a zero or small angle—which means one less than or equal to 10 degrees—with respect to the circumferential direction. This stiffening reinforcement 140 is arranged in such a way that the distance DAE between the radially innermost point 71 of the bead wire 70 and the radially outer end 142 of the stiffening reinforcement 140 is equal to 35% of the radial height H of the tire 10. The distance DAI between the radially innermost point 71 of the bead wire 70 and the radially inner end 141 of the stiffening reinforcement 140 here is equal to 5% of the radial height H of the tire 10.

A "decoupling layer" 150 made of rubber compound is situated axially between the stiffening reinforcement 140 and the main portion 62 of the carcass reinforcement 60. The decoupling layer has a radially inner end 151 and a radially outer end 152. By shearing, this decoupling layer 150 allows the meridian tension in the carcass reinforcement 60 to be transmitted to the stiffening reinforcement 140. It therefore limits transfer stresses between the stiffening reinforcement 140 and the carcass reinforcement 60, and at the same time evens out the thickness through which these stresses are applied, thus contributing to a better distribution of these stresses.

Figure 9:
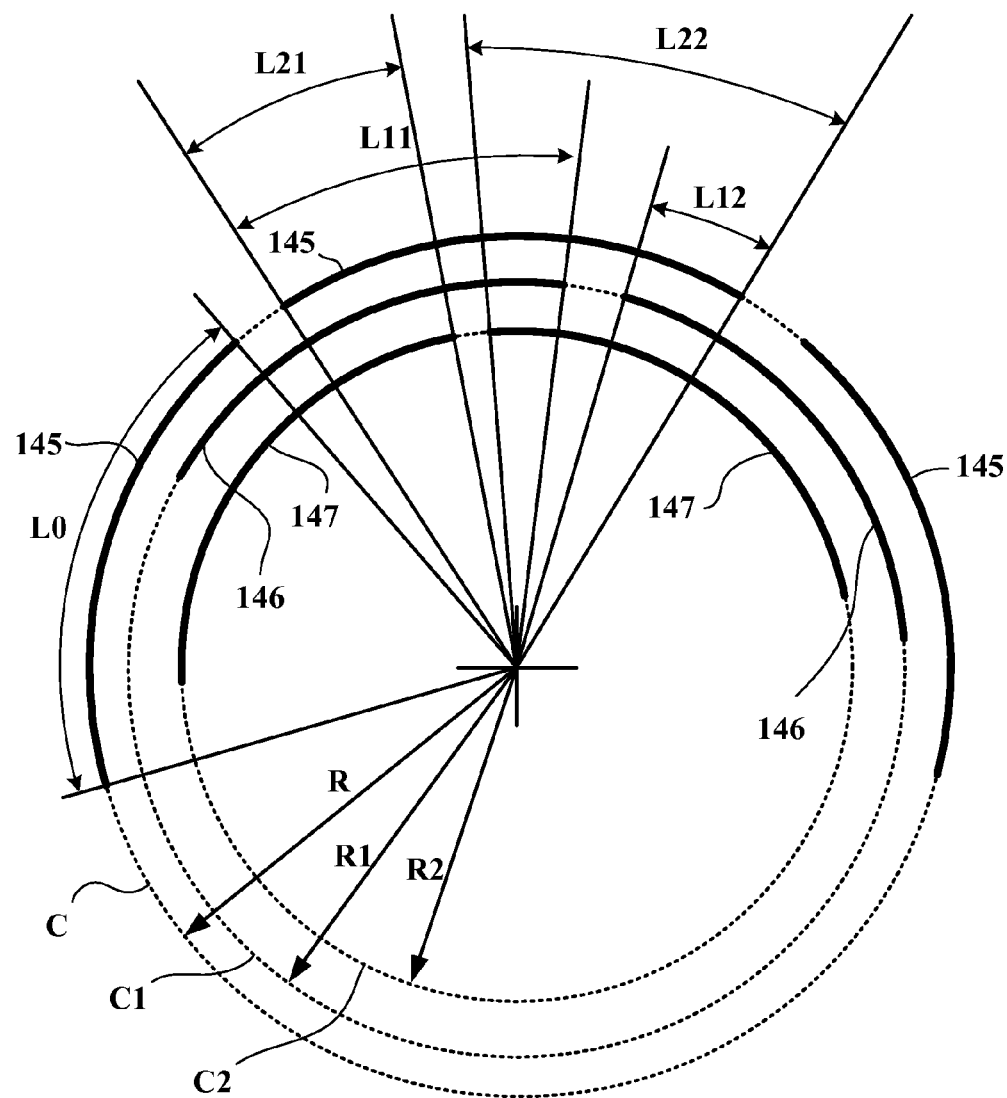
FIG. 9 shows the arrangement of the reinforcements of one ply of the stiffening reinforcement used in the bead of the tire of FIG. 6.

The stiffening reinforcement 140 of the tire 10 depicted in FIG. 5 is made up of a plurality of discontinuous reinforcing elements, these reinforcing elements being arranged in a plurality of circles (C, C1, C2) concentric with the axis of rotation of the tire, each circle being defined by a mean radius R, R1, R2 measured with respect to the axis of rotation as illustrated in FIG. 9. This is of course a simplified diagram, limited to three turns, to explain the principle of how the reinforcements are arranged. The stiffening reinforcement may naturally comprise a greater number of turns.

FIG. 9 shows the arrangement of the reinforcing elements of the stiffening reinforcement 140 of the tire 10 on three adjacent circles C, C1 and C2, each circle being centred on the axis of rotation of the assembly formed by the tire and the mounting rim. All the reinforcing elements are made of metal and have substantially the same length equal to L0, in this instance 125 mm. The spacing between adjacent circles C, C1 and C2, on which the discontinuous reinforcing elements are arranged, is equal to the thickness of the reinforcing elements increased by at least 0.2 mm, and preferably by at least 0.5 mm.

FIG. 9 partially depicts the stiffening reinforcement 140, the axis of rotation of the tire being perpendicular to the plane of the figure. It can be seen that a reinforcing element 145 of length L0 on the circle C of radius R is mechanically coupled along arc lengths L11 and L12 with two reinforcing elements 146 on the circle C1 of radius R1 (R1 being less than R) adjacent to the circle C. The same reinforcing element 145 is coupled along arc length L21 and L22 to two reinforcing elements 147. In the instance that has been depicted the coupling lengths are: L11=87.9 mm (i.e. close to 70% of L0); L12=37.7 mm (i.e. close to 30% of L0); L21=50.2 mm (i.e. close to 40% of L0); L22=75.3 mm (i.e. close to 60% of L0). These coupling lengths satisfy the relationship 1.5≤K≤4 where K=(1−L12/L0)/(1−L11/L0). Specifically, the value adopted by K is 2.3 when considering values for coupling between a reinforcing element 145 of length L0 on the circle C and the reinforcing elements 146 on the circle C1 of radius R1 (R1 being less than R) adjacent to circle C.

FIG. 6 depicts, in radial section, part of a tire according to an embodiment of the invention. This tire possesses the features of the tire of the prior art described hereinabove and improves it in order to improve its endurance. For the sake of conciseness, only the distinctive points of this tire by comparison with the tire according to the prior art depicted in FIG. 5 will be highlighted.

The bead 20 comprises an outer strip 170 placed axially on the outside of the carcass reinforcement 60 and of the filler 110, which extends radially on the outside of a radially inner end 171 of the outer strip 170, situated at a distance DRI from the radially innermost point 71 of the bead annular reinforcing structure 70. In this instance, DRI is equal to 3% of the radial height H of the tire. The outer strip 170 extends as far as a radially outer end 172. The radial distance DRL between the radially outer end of the outer strip and the radially inner end of the outer strip is in this instance equal to 30% of the radial height H of the tire. The outer strip is made of at least one fourth rubber compound having an elastic modulus G' less than or equal to 15 MPa and a viscous modulus G" such that:

$$G''[\text{MPa}] \leq 0.2 \cdot G'[\text{MPa}] - 0.2 \text{ MPa},$$

the elastic and viscous moduli being measured at 23° C. Examples of such compounds have been disclosed in Patent Application WO 2010/072736.

A layer 180 of rubber compound is provided between the stiffening reinforcement 140 and the outer strip 170.

The assembly formed by the stiffening reinforcement 140 and the outer strip 170 has a thickness EB(R). Of course, when a layer of rubber compound is inserted between the stiffening reinforcement 140 and the outer strip 170, like the layer 180 in this instance, EB(R) takes account of the thickness of this layer also. As illustrated in FIG. 8, the thickness EB(R) corresponds to the length of the intersection of the direction perpendicular to the main portion 62 of the carcass reinforcement with said assembly, R denoting the distance separating the intersection of said direction perpendicular to the main portion 62 of the carcass reinforcement with the carcass reinforcement 60 from the radially innermost point 71 of the bead wire 70. FIG. 8 shows the value of EB(R) for R=R1.

Figure 12:
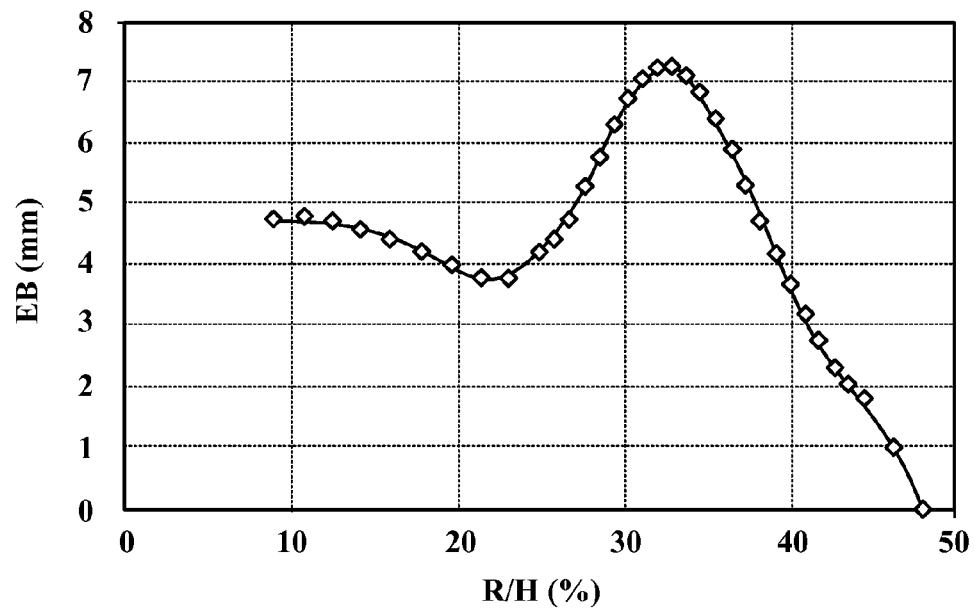
Figure 13:
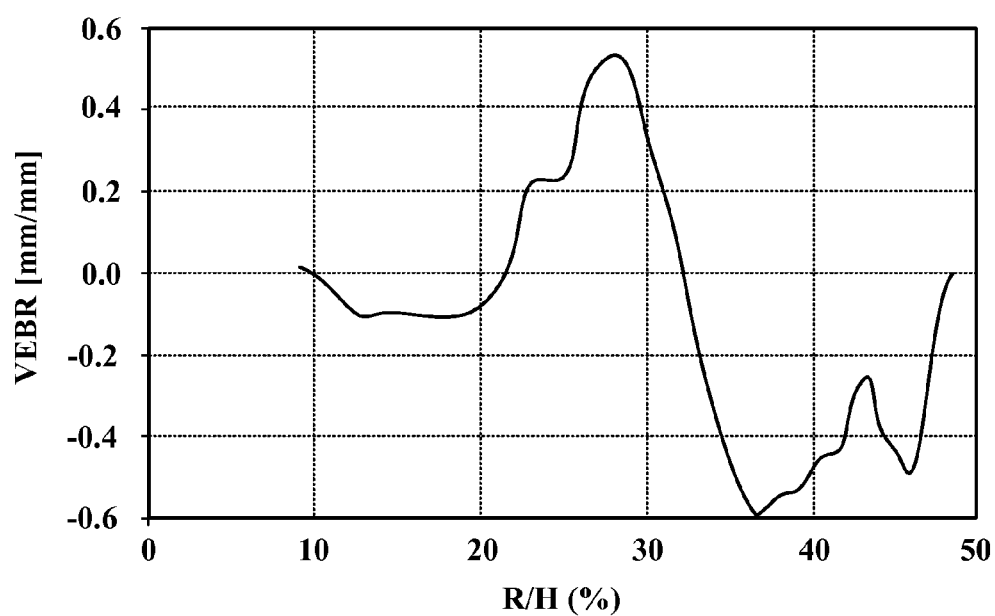

FIG. 12 depicts the thickness EB(R) of the tire of FIG. 6, as a function of the ratio R/H. FIG. 13 depicts the corresponding values $$VEBR = \frac{\partial EB(R)}{\partial R}.$$

It may be noted that the thickness EB(R) changes such that:
(i) in the range of distances r of between 10 and 20% of the height H of the tire, the variation in thickness VEBR is negative and its absolute value is greater than or equal to 0.0 mm/mm and less than or equal to 0.1 mm/mm, over more than 5% of the height H of the tire;
(ii) in the range of distances r of between 15 and 25% of the height H of the tire, the variation in thickness VEBR is positive and its absolute value is greater than or equal to 0.20 mm/mm, over more than 2% of the height H of the tire;
(iii) in the range of distances r of between 25 and 45% of the height H of the tire, the variation in thickness VEBR is negative and its absolute value is greater than or equal to 0.3 mm/mm, over more than 4% of the height H of the tire.

The tire according to an embodiment of the invention also comprises a protective layer 160 formed of at least one fifth rubber compound (examples of which are known to those skilled in the art) and arranged axially on the outside of the outer strip 170, this protective layer having a thickness EE(R). As has been indicated in FIG. 8, this thickness corresponds to the length of the intersection of the direction perpendicular to the axially outer contour 175 of the outer strip 170 with said protective layer. FIG. 8 shows the value of EE(R) for R=R2.

Figure 14:
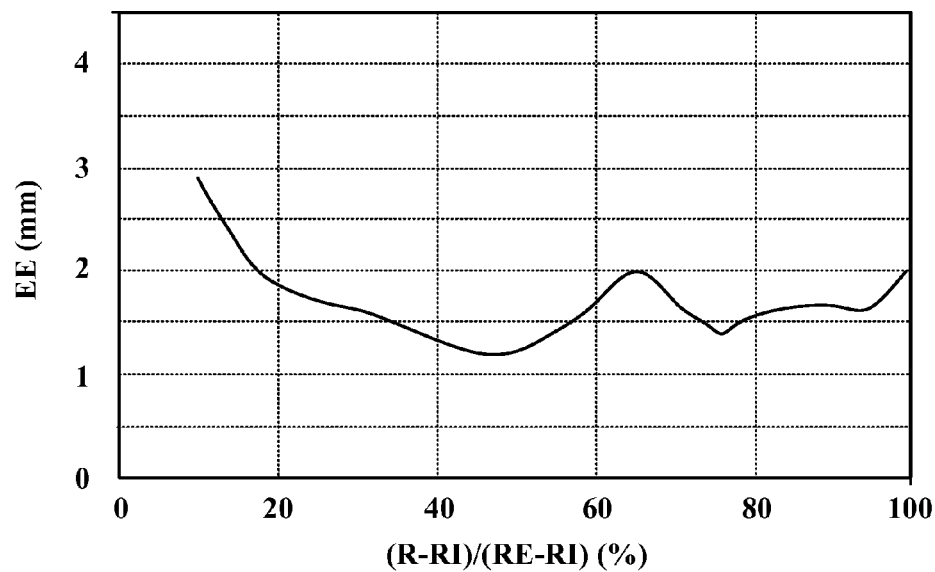
Figure 15:
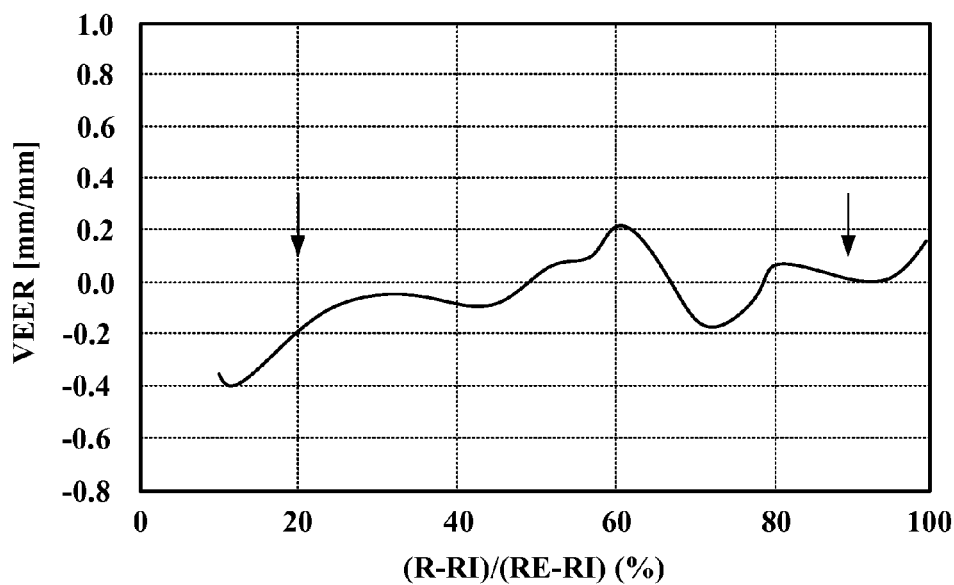

FIG. 14 depicts the thickness EE(R) of the tire of FIG. 6, as a function of the ratio R/H. FIG. 15 depicts the corresponding values $$VEER = \frac{\partial EE(R)}{\partial R}.$$

It may be seen that the thickness EE(R) changes such that the variation in thickness VEER is greater than or equal to −0.20 mm/mm and less than or equal to 0.20 mm/mm for values of R of between R=RI+0.20·(RE−RI) and R=RI+0.885·(RE−RI) where "RI" denotes the value corresponding to the radially inner end of the outer strip and "RE" denotes the value corresponding to the radially outer end of the outer strip.

Moreover, the radially outer end 172 of the outer strip 170 is situated radially on the outside of the radially outer end 142 of the stiffening reinforcement 140; the radial distance DD separating these ends is equal to 4.5 mm.

The thickness EX of rubber compound separating the carcass reinforcing elements and the metal reinforcing elements of the stiffening reinforcement, measured between the surfaces of the reinforcing elements, is at all points greater than or equal to 0.8 mm. This thickness is indicated in FIG. 8 for R=R1.

FIG. 7 shows the bead of the tire of FIG. 6 after it has been mounted on the mounting rim 5 and inflated. The mounting rim 5 comprises a part forming a rim seat and, radially on the outside, has a rim flange 6 of substantially circular profile. The center of the circle (which defines the "center of the rim flange" 6) is indicated using the reference J. The radially outer end 142 of the stiffening reinforcement 140 is situated on a straight line J2 passing through the center J of the center of the rim flange and making with an axial direction an angle α (alpha) open axially towards the inside and radially towards the outside, the angle α (alpha) here being equal to 112°.

A tire according to an embodiment of the invention, corresponding to the tire depicted in FIG. 6, and a reference tire (the tire depicted in FIG. 5) were compared under rolling conditions (tire size studied: 205/55 R16). The tire according to an embodiment of the invention was found to have the same rolling resistance as the reference tire, but its cornering stiffness was significantly improved, for the same load and the same inflation pressure.

TABLE 1

| Variant | FIG. | Rolling resistance (base 100) | Cornering stiffness (base 100) |
|---|---|---|---|
| Prior Art | 5 | 100 | 100 |
| Invention | 8 | 100 | 110 |

It might have been expected that the addition of the outer strip—which contributes to the cornering stiffness—would also increase the contribution that the bead makes to rolling resistance. However, surprisingly, it does no such thing. The applicant explains this astounding observation by the fact that the metal reinforcing elements in fact limit the flexural deformation of the outer strip.

The invention claimed is:
1. A tire comprising:
two beads designed to come into contact with a mounting rim, each bead comprising at least one annular reinforcing structure having a radially innermost point;
two sidewalls extending the beads radially outwards, the two sidewalls meeting in a crown comprising a crown reinforcement, surmounted by a tread;
at least one radial carcass reinforcement extending from the beads through the sidewalls as far as the crown, the carcass reinforcement comprising a plurality of carcass reinforcing elements embedded in at least one first rubber compound, the carcass reinforcement being anchored in the two beads by being wrapped around the annular reinforcing structure so as to form, within each bead, a main portion and a wrapped-around portion, each wrapped-around portion extending radially outwards as far as an end situated a radial distance DRE from the radially innermost point of the bead annular reinforcing structure, the radial distance DRE being greater than or equal to 5% and less than or equal to 20% of the radial height H of the tire;
wherein at least one bead comprises a filler made of at least one second rubber compound having an elastic modulus greater than or equal to 40 and less than or equal to 60 MPa, the filler being situated, at least partially, radially on the outside of the annular reinforcing structure and at least partially between the main portion and the wrapped-around portion of the carcass reinforcement, the filler extending radially as far as a radial distance DBE from the radially innermost point of the bead annular reinforcing structure, the radial distance DBE being less than or equal to 10% of the radial height H of the tire;
wherein said filler has an axial thickness E(r), this thickness corresponding to the length of the intersection of the filler with a straight line parallel to the axis of rotation of the tire and having an intersection with the filler at a radial distance r from the radially innermost point of the annular reinforcing structure, wherein the thickness E(r) changes such that, in the range of distances r of between 0% and 10% of the radial height H of the tire, the variation in thickness $$\frac{\partial E(r)}{\partial r}$$

is negative and its absolute value is greater than or equal to 0.5 mm/mm, over at least 3% of the radial height H of the tire;

wherein the sidewall extending said at least one bead of the tire further comprises a stiffening reinforcement formed of a plurality of metal reinforcing elements embedded in at least one third rubber compound and oriented at an angle less than or equal to 10 degrees with respect to the circumferential direction, the stiffening reinforcement having, in each radial section, a radially inner end and a radially outer end, such that:
  (i) the radial distance DAI between the radially innermost point of the annular reinforcing structure and the radially inner end of the stiffening reinforcement is greater than or equal to 5% and less than or equal to 15% of the radial height H of the tire;
  (ii) the radial distance DAI between the radially innermost point of the annular reinforcing structure and the radially outer end of the stiffening reinforcement is greater than or equal to 20% and less than or equal to 40% of the radial height H of the tire;

wherein said at least one bead further comprises an outer strip placed axially on the outside of the carcass reinforcement and of the filler, each outer strip extending from radially inner end of the outer strip, situated a distance DRI from the radially innermost point of the bead annular reinforcing structure, DRI being less than or equal to 20% of the radial height H of the tire, as far as a radially outer end, the radial distance DRL between the radially outer end of the outer strip and the radially inner end of the outer strip being greater than or equal to 25% of the radial height H of the tire, and the outer strip is made from at least one fourth rubber compound having an elastic modulus G' less than or equal to 15 MPa and a viscous modulus G'' such that:

G''[MPa]≤0.2·G'[MPa]−0.2 MPa, the elastic and viscous moduli being measured at 23° C.; wherein the assembly formed by the stiffening reinforcement and the outer strip has a thickness EB(R), this thickness corresponding to the length of the intersection of the direction perpendicular to the main portion of the carcass reinforcement with said assembly, R denoting the distance separating the intersection of said direction perpendicular to the main portion of the carcass reinforcement with the carcass reinforcement from the radially innermost point of the annular reinforcing structure, wherein the thickness EB(R) changes such that:
  (i) in the range of distances r of between 10 and 20% of the height H of the tire, the variation in thickness $$\frac{\partial EB(R)}{\partial R}$$

is negative and its absolute value is greater than or equal to 0.0 mm/mm and less than or equal to 0.1 mm/mm, over at least 5% of the height H of the tire,
  (ii) in the range of distances r of between 15 and 25% of the height H of the tire, the variation in thickness $$\frac{\partial EB(R)}{\partial R}$$

is positive and its absolute value is greater than or equal to 0.20 mm/mm, over at least 2% of the height H of the tire,
  (iii) in the range of distances r of between 25 and 45% of the height H of the tire, the variation in thickness $$\frac{\partial EB(R)}{\partial R}$$

is negative and its absolute value is greater than or equal to 0.25 mm/mm, over at least 4% of the height H of the tire, wherein a protective layer formed of at least one fifth rubber compound is arranged axially on the outside of the outer strip, this protective layer having a thickness EE(R), this thickness corresponding to the length of the intersection of the direction perpendicular to the axially outer contour of the outer strip with said protective layer, wherein the thickness EE(R) changes such that the variation in thickness $$\frac{\partial EE(R)}{\partial R}$$

is greater than or equal to −0.20 mm/mm and less than or equal to 0.20 mm/mm for values of R of between R=RI+ 0.20·(RE−RI) and R=RI+0.885·(RE−RI) where "RI" denotes the value corresponding to the radially inner end of the outer strip and "RE" denotes the value corresponding to the radially outer end of the outer strip.

2. The tire according to claim 1, wherein the radial distance DRE is greater than or equal to 7% and less than or equal to 18% of the radial height H of the tire.

3. The tire according to claim 1, wherein the filler has an axial thickness E(r), this axial thickness corresponding to the length of the intersection of the filler with a straight line parallel to the axis of rotation of the tire and having an intersection with the filler at a radial distance r from the radially innermost point of the annular reinforcing structure, wherein the axial thickness E(r) changes such that, in the range of distances r of between 0% and 10% of the radial height H of the tire, the variation in axial thickness $$\frac{\partial E(r)}{\partial r}$$

is negative and its absolute value is greater than or equal to 1 mm/mm, over at least 1.5% of the radial height H of the tire.

4. The tire according to claim 1, wherein, in any radial section, the radially outer end the outer strip is situated radially on the outside of the radially outer end of the stiffening reinforcement such that a radial distance DD separating these ends is less than or equal to 8 mm.

5. The tire according to claim 4, wherein the radial distance DD separating these radially outer ends is less than or equal to 5 mm.

6. The tire according to claim 1, wherein a radial distance DAE between the radially innermost point of the annular reinforcing structure and the radially outer end of the stiffening reinforcement is greater than or equal to 25% and less than or equal to 35% of the radial height H of the tire.

7. The tire according to claim 1, wherein in the range of distances r of between 25 and 45% of the height H of the tire, the variation in thickness $$\frac{\partial EB(r)}{\partial r}$$

is negative and its absolute value is greater than or equal to 0.30 mm/mm, over at least 4% of the height H of the tire.

8. The tire according to claim 1, wherein, in any radial section, the thickness (EX) of rubber compound separating the reinforcing elements of the carcass and the metal reinforcing elements of the stiffening reinforcement is at all points greater than or equal to 0.8 mm.

9. The tire according to claim 1, designed to be mounted on a mounting rim comprising a part forming a rim seat and, radially on the outside of the rim seat, a rim flange of substantially circular profile, wherein, when the tire is mounted on its mounting rim, the radially outer end of the stiffening reinforcement is situated on a straight line J2 passing through the centre J of the profile of the rim flange and making with an axial direction an angle α (alpha) open axially towards to the inside and radially towards the outside, the angle α (alpha) being greater than or equal to 90° and less than or equal to 120°.

10. The tire according to claim 9, wherein the angle α (alpha) is greater than or equal to 100° and less than or equal to 115°.

11. The tire according to claim 1, wherein the stiffening reinforcement is made up of a plurality of discontinuous reinforcing elements, these reinforcing elements being arranged in a plurality of circles (C, C1, C2) concentric with the axis of rotation of the tire.

12. The tire according to claim 1, wherein the stiffening reinforcement is made up of a plurality of discontinuous reinforcing elements of length L0, these reinforcing elements being arranged in a plurality of circles (C, C1, C2) concentric with the axis of rotation of the tire mounted on its rim, each circle being defined by a mean radius (R, R1, R2) measured with respect to said axis of rotation, each discontinuous reinforcing element of length L0 situated on a circle C of radius R being mechanically coupled over coupling lengths L11 and L12 respectively to two discontinuous reinforcing elements situated on a circle C1 of radius R1 less than the radius R, said circle being immediately adjacent to the circle C, wherein the coupling lengths L11 and L12, L11 being considered to be greater than or equal to L12, satisfy the following relationship: 1.5≤K≤4 where K=(1−L12/L0)/(1−L11/L0).

13. The tire according to claim 12, wherein:
(a) each discontinuous reinforcing element of length L0 situated on a circle C of radius R is mechanically coupled over coupling lengths L11 and L12 to two discontinuous reinforcing elements situated on a circle C1 of radius R1, which circle is immediately adjacent to the circle C, the coupling length L11 being greater than or equal to 55% of L0 and less than or equal to 75% of L0, and the coupling length L12 being greater than or equal to 10% of L0 and less than or equal to 30% of L0;
(b) each discontinuous reinforcing element of length L0 situated on a circle C of radius R is mechanically coupled over coupling lengths L21 and L22 to two discontinuous reinforcing elements situated on a circle C2 of radius R2, which circle is immediately adjacent to the circle C1, the coupling length L21 being greater than or equal to 20% of L0 and less than or equal to 40% of L0, and the coupling length L22 being greater than or equal to 45% of L0 and less than or equal to 65% of L0.

\* \* \* \* \*